United States Patent
Harrington et al.

(10) Patent No.: US 10,980,069 B2
(45) Date of Patent: Apr. 13, 2021

(54) WIRELESS CONNECTION MODE ACTIVATION

(71) Applicant: Hughes Network Systems, LLC, Germantown, MD (US)

(72) Inventors: Emanuel Harrington, Bowie, MD (US); David McLaurin, Rockville, MD (US); Hasme Rafsan Jani, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 32 days.

(21) Appl. No.: 16/227,092

(22) Filed: Dec. 20, 2018

(65) Prior Publication Data

US 2020/0205207 A1 Jun. 25, 2020

(51) Int. Cl.
*H04W 76/11* (2018.01)
*H04W 12/00* (2021.01)
*H04L 29/06* (2006.01)
*H04L 9/32* (2006.01)

(52) U.S. Cl.
CPC .......... *H04W 76/11* (2018.02); *H04W 12/004* (2019.01); *H04L 9/32* (2013.01); *H04L 63/083* (2013.01); *H04L 63/0853* (2013.01); *H04L 63/10* (2013.01); *H04L 63/107* (2013.01); *H04L 63/108* (2013.01); *H04L 63/12* (2013.01); *H04L 63/16* (2013.01); *H04L 63/20* (2013.01)

(58) Field of Classification Search
CPC ... H04W 76/11; H04W 12/004; H04W 12/06; H04W 12/04071; H04W 12/0808; H04L 63/16; H04L 63/20; H04L 63/108; H04L 63/12; H04L 63/107; H04L 63/10; H04L 9/32; H04L 63/083; H04L 63/0853; H04L 63/0846; H04L 63/101
See application file for complete search history.

(56) References Cited

U.S. PATENT DOCUMENTS

| | | | |
|---|---|---|---|
| 8,818,276 B2* | 8/2014 | Kiukkonen | H04L 63/107 455/41.2 |
| 9,357,385 B2* | 5/2016 | Benoit | H04L 12/2809 |
| 9,398,452 B1* | 7/2016 | Upp | H04W 12/04 |
| 9,571,282 B1* | 2/2017 | Aggarwal | H04L 63/0853 |
| 10,462,665 B2* | 10/2019 | Kurian | H04W 12/06 |
| 2013/0309971 A1* | 11/2013 | Kiukkonen | H04L 63/107 455/41.2 |
| 2016/0242137 A1* | 8/2016 | Benoit | H04L 12/2809 |
| 2019/0319951 A1* | 10/2019 | West, III | H04L 63/126 |

* cited by examiner

*Primary Examiner* — Brian T O Connor
(74) *Attorney, Agent, or Firm* — Bejin Bieneman PLC

(57) ABSTRACT

A system includes a router including a processor and a memory. The memory stores instructions executable by the processor to receive a wireless request from a first computing device to initiate a connection mode for a wireless network. The instructions are further executable to join a second computing device to the wireless network under the connection mode. wherein the connection mode allows the second device to join the wireless network without input of a password stored prior to the wireless request.

16 Claims, 3 Drawing Sheets

WIRELESS CONNECTION MODE ACTIVATION

BACKGROUND

Routers can be equipped with a button to initiate a connection mode, i.e., in response to detecting an activation of the button, the router can be programmed to initiate the connection mode for a time during which computing devices can join a wireless network provided by the router without user input to submit an identifier previously stored by the router. Routers may be installed in remote or inconvenient locations.

DESCRIPTION

Introduction

Figure 1:
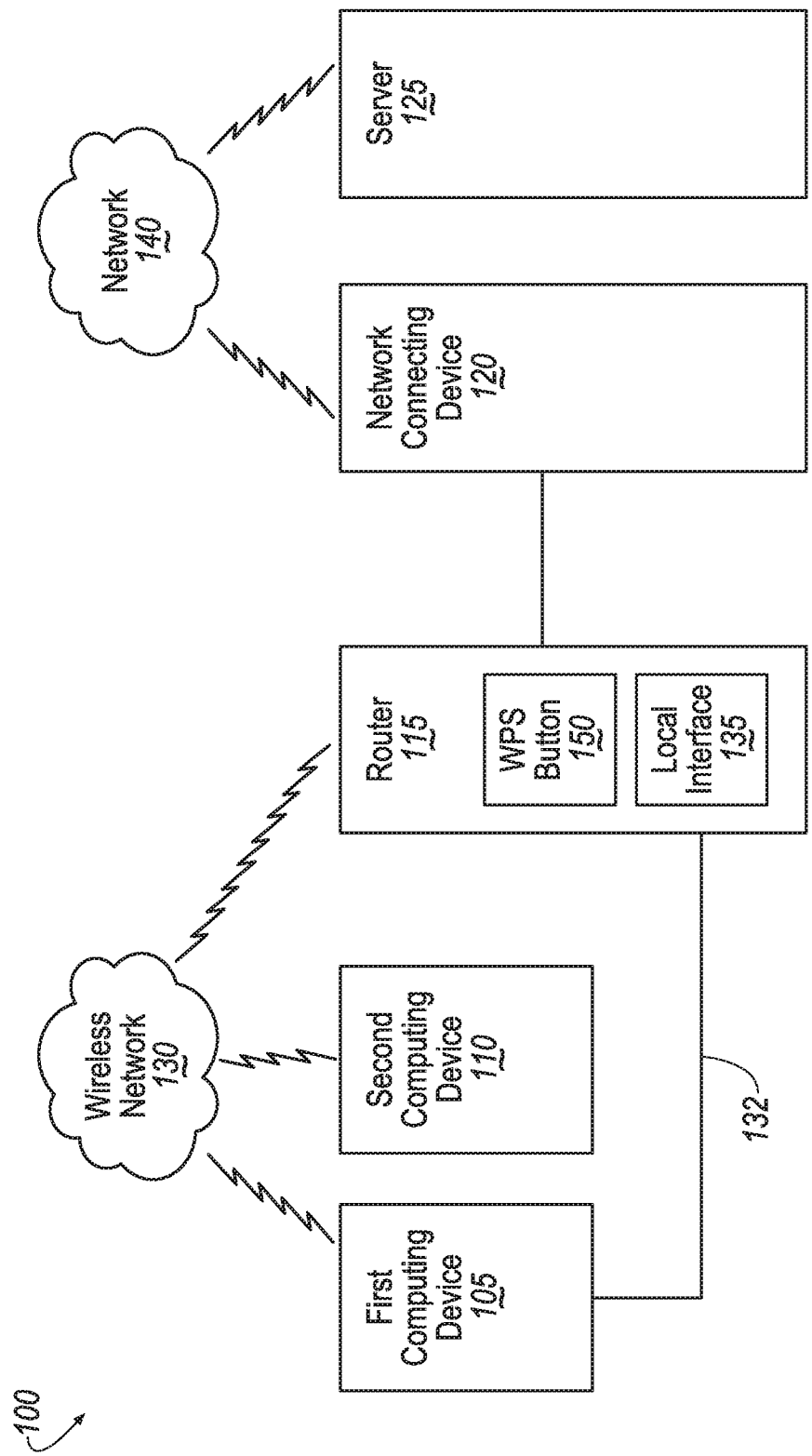
FIG. 1 illustrates an example network system including a wireless router.

Disclosed herein is a system comprising a router including a processor, and a memory storing instructions executable by the processor to receive a wireless request from a first computing device to initiate a connection mode for a wireless network; and join a second computing device to the wireless network under the connection mode. The connection mode allows the second device to join the wireless network without input of a password stored prior to the wireless request.

The connection mode may be active for a predetermined time after initiation. Further, the connection mode may be a Wi-Fi protected setup (WPS) mode.

The instructions may further include instructions to receive a set of parameters specifying the connection mode from the first device; and initiate the connection mode based on the parameters.

The set of parameters may specify at least one of an amount of time for the connection mode, a type of computing device authorized to join the wireless network and specification that a temporary password is required to join the wireless network.

The instructions may further include instructions to verify that the second computing device is of a type specified by the set of parameters.

The instructions may further include instructions to receive a request from the second computing device to connect to the wireless network; and verify that the request is received within a Wi-Fi protected setup (WPS) mode.

The instructions may further include instructions to transmit a temporary password to the first computing device based on receiving the wireless request; and join the second computing device to the wireless network based on receiving the temporary password from the second computing device.

The instructions may further include instructions to provide the second computing device network operations based on joining the second computing device to the wireless network.

The system may further comprise the first computing device. The first computing device may include a second processor, and a second memory storing second instructions executable by the second processor to transmit the wireless request to initiate a connection mode for a wireless network. The second instructions may further include instructions to display a user interface to a user; receive input from the user specifying an access parameter for the connection mode; and transmit the access parameter to the router 115.

Further disclosed herein is a method, comprising receiving a wireless request from a first computing device to initiate a connection mode for a wireless network; and joining a second computing device to the wireless network under the connection mode. The connection mode allows the second device to join the wireless network without input of a password stored prior to the wireless request.

The connection mode may be active for a predetermined time after initiation. Further, the connection mode may be a Wi-Fi protected setup (WPS) mode.

The method may further include receiving a set of parameters specifying the connection mode from the first device; and initiating the connection mode based on the parameters.

The set of parameters may specify at least one of an amount of time for the connection mode, a type of computing device authorized to join the wireless network and specification that a temporary password is required to join the wireless network.

The method may further include verifying that the second computing device is of a type specified by the set of parameters.

The method may further include receiving a request from the second computing device to connect to the wireless network; and verifying that the request is received within a Wi-Fi protected setup (WPS) mode.

The method may further include transmitting a temporary password to the first computing device based on receiving the wireless request; and joining the second computing device to the wireless network based on receiving the temporary password from the second computing device.

The method may further include providing the second computing device network operations based on joining the second computing device to the wireless network.

Exemplary System Elements

As illustrated in FIG. 1, a system 100 includes one or more user computing devices such as the illustrated devices 105, 110, a router 115, a network connecting device 120, and may further include a server 125, each having a processor, a memory, and as will be understood, typically other hardware components. Additional devices are not shown for ease of illustration.

A computer memory, e.g., for storing instructions executable by a processor, can be implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media. The memory may store instructions executable by the processor and other data. The processor is implemented via circuits, chips, or other electronic component(s) and may include one or more microcontrollers, one or more field programmable gate arrays (FPGAs), one or more application specific integrated circuits (ASICs), one or more digital signal processors (DSPs), one or more customer specific integrated circuits, etc. The processors may be included in and programmed to execute instructions stored in a memory to carry out the actions of, variously, the router 115, the first and second computing devices 105, 110, the network connecting device 120, and the server 125 as discussed herein.

The first and second computing devices 105, 110 include a computer including a processor and a memory and a human machine interface and may be, for example, a laptop or desktop computer, a smart phone, a tablet, etc. The first and second computing devices 105, 110 are programmed to receive input from a user via the human machine interface and transmit data to the router 115 according to a wireless communication standard such as IEEE 802.11.

The router 115 may be communicatively coupled, via a wireless network 130 to the first computing device 105 and the second computing device 110. The router 115 includes a local interface 135. The local interface 135 provides short range communications via the wireless network 130. In one example, the wireless network 130 may operate according to the IEEE 802.11 specification, including the protocol known as Wi-Fi®. Via Wi-Fi or the like in the local interface 135, the router 115 may communicate with the first and second computing devices 105, 110, e.g., within a coverage range, e.g., 200 meters of the router 115.

Additionally, the local interface 135 may be arranged to support communication with the first and second computing devices 105, 110 according to Zigbee® or Bluetooth® Low Energy standards and/or according to wired communications, e.g., based on Ethernet or the like. For example, the first computing device 105 may have a wired connection 132 to the router 115. In an example, the wired connection 132 includes an Ethernet cable physically connecting the first computing device 105 and the router 115.

The router 115 includes programming to join a computing device such as the first computing device 105 and second computing device 110 to the wireless network 130. Joining a device to the wireless network 130, as used herein, means to add the device to a list of devices recognized to be authorized to communicate via the wireless network 130 to the router 115.

In some cases, a computing device such as the computing device 105 can connect, i.e., be communicatively coupled, to the router 115 without joining the wireless network 130, such as through the wired connection 132. Additionally or alternatively, computing devices may connect to the router 115 via another wireless protocol, such as the Zigbee® or Bluetooth® Low Energy standards, not included in the wireless network 130.

The router 115 is typically programmed to maintain, and typically stores in a non-volatile or persistent memory, a list of computing devices authorized to communicate via, i.e., that are joined to, the wireless network 130. Computing devices such as computing devices 105, 110 have unique or substantially unique identifiers, e.g., an alphanumeric identifier such as a Media Access Control (MAC) address, which can be included in communications from the respective computing devices. A list of authorized computing devices stored in a memory of a router 115 typically includes the identifiers of computing devices that have been authorized.

The router 115 is programmed to confirm that incoming communications (i.e., communications received via the wireless network 130) come from a computing device joined to (i.e., authorized to communicate with other devices over) the wireless network 130. The router 115 looks for a device identifier in incoming communications, and only accepts communications that include a device identifier included in the list of authorized computing devices.

The router 115 further includes programming to add and/or remove devices to or from the stored list of authorized computing devices. For example, the router 115 may support Wi-Fi Protected Setup (WPS). WPS is a wireless security network standard, certified by the Wi-Fi Alliance (10900-B Stonelake Boulevard, Suite 126, Austin, Tex. 78759 U.S.A.; see https://www.wi-fi.org/), to facilitate establishing encrypted wireless connections between a router such as the router 115, and a computing device such as the first computing device 105 or second computing device 110.

For example, a user may wish to join the first computing device 105 to the wireless network 130. In one instance, the first computing device 105 may detect that the wireless network 130 is available in a location where the first computing device 105 is operating. The first computing device 105 may transmit a request to connect to the wireless network 130. For example, a user of the first computing device 105 may select the wireless network 130 from a list of available networks presented to the user on a user interface.

Upon receiving the request to connect to the router 115, the router 115 may respond by requesting that the first computing device 105 supply an alphanumeric password or the like stored by the router 115 prior to receiving the wireless request, and which the router 115 is programmed to require from a device 105, 110 for authentication and access to the wireless network 130.

To respond to the router 115, the user of the first computing device 105 may obtain the password (which may be included on a WPS configuration user interface provided by the router 115, e.g., via a web page or the like, and/or included on a label such as a rear label on the router 115) and input it to the first computing device 105. The first computing device 105 may then transmit the password, together with an identifier for the first computing device 105, to the router 115. Upon receiving the password and identifier from the first computing device 105, the router 115 can add the identifier to the list of authorized computing devices for the wireless network 130.

In another instance, the router 115 may include a WPS button 150. The WPS button 150 is a physical button, switch, etc., typically located on a case of the router 115, that can be activated (e.g., pressed or pushed) by a user. The router 115 may be programmed, upon detecting an activation of the WPS button 150, to open a connection mode. A connection mode is an access window, i.e., an amount of time (e.g., two minutes) during which a computing device such as the first computing device 105 can join the wireless network 130 without submitting a password. Initiating a connection mode may also be referred to herein as initiating the Wi-Fi protected setup mode.

For example, during the connection mode, a user may select the wireless network 130 from a list of available networks presented on a user interface of the first computing device 105. The first computing device 105 may send a request including the first computing device identifier to the router 115 to join the wireless network 130. The router 115 may receive the request and add the first computing device identifier to the list of authorized computing devices.

In another example, the router 115 may include programming to initiate the connection mode based on receiving a command from a computing device connected to the router 115. A computing device connected to the router 115 includes computing devices previously joined to the wireless network 130 and may further include computing devices connected via alternative wireless or wired connections. For example, a first computing device 105 may have been previously added to the list of authorized computing devices for the wireless network 130. The first computing device 105 may transmit a command to the router 115 to initiate the connection mode for connecting to other computing devices, such as the second computing device 110.

In response to the command, the router 115 may initiate a connection mode (e.g., if the router 115 provides a Wi-Fi network 130, initiate the WPS mode) during which a computing device can join the wireless network 130 without input of a password stored prior to the wireless request. A user of the second computing device 110 may select the wireless network 130 on a user interface on the second computing device 110. The second computing device 110 may, based on the user selection, send a request to join the wireless network 130 including an identifier for the second computing device 110 to the router 115. In a case that the router 115 receives the request within the connection mode, the router 115 can be programmed to add the second computing device 110 to the list of authorized devices.

The router 115 may further include or have access to non-volatile memory or data store that can include program instructions executable for wireless activation of the connection mode. For example, the first computing device 105 may download and install the software application from the router 115. When the first computing device 105 is connected to the router 115, a user may initiate the connection mode on the router 115 from the first computing device 105 by providing input to the router 115, upon receipt of which the router 115 initiates execution of the connection mode.

The router 115 may further be programmed to communicate via a network connecting device 120 and network 140 to a server 125.

The network connecting device 120 is a computer-based communications device implemented via circuits, chips, antennas and other electronic components that can communicate with, for example a satellite and/or cable-based network and may include a modulator and/or demodulator (e.g., as in a conventional modem) to facilitate communications with a network, such as the network 140. In some cases, the router 115 and network connecting device 120 may be included in a terminal, e.g., a very small aperture terminal (VSAT) for satellite communications. Accordingly, the connection between the router 115 and the network connecting device 120 may be external or included within a common chassis.

The server 125 is a computing device connected via a wired and/or wireless connection to communicate via a network 140 and may, in some cases, be classified as a Network Operating Center or HUB. Additionally or alternatively to the router 115, the server 125 may include and/or have access to a non-volatile memory or data store that can include the software application for wireless activation of the connection mode to join the wireless network 130. In this case, e.g., the first computing device 105 may download a software application (i.e., what is popularly referred to as an "app") for wireless activation of the connection mode from the server 125.

The network 140 may be a wide area network, and represents one or more mechanisms, typically including the Internet, for sending and receiving data between first and second computing devices 105, 110 via the router 115 and network connecting device 120, and other computing devices such as the server 125. The network 140 is distinguished from the wireless network 130 in that the network 140 can encompass any distance on the surface of the earth, whereas the wireless network 130 is limited to a specified geographic area, typically a single building, complex, or campus, e.g., according to a wireless range of one or more routers 115. The network 140 may be one or more of various wired or wireless communication mechanisms, including any desired combination of wired (e.g., cable and fiber) and/or wireless (e.g., cellular, wireless, satellite, microwave, and radio frequency) communications mechanisms and any desired network topology (or topologies when multiple communication mechanisms are utilized).

Figure 2:
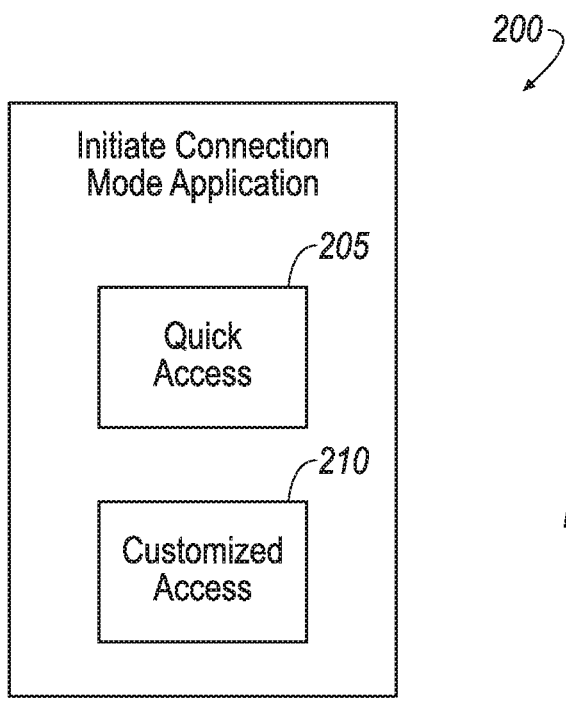
FIG. 2 is a user interface for activating a connection mode via a computing device.

As described above, a computing device such as the first computing device 105 may download a software application (the initiate connection mode application) for wireless activation of the connection mode from one of the router 115 or the server 125. When activated by a user, the initiate connection mode application may, for example, display on the first computing device 105 a first example user interface 200 as shown in FIG. 2.

The first user interface 200, may, for example, include two virtual buttons, a "Quick Access" button 205 and a "Customized Access" button 210. The Quick Access button may initiate the connection mode to join the wireless network 130 based on a default set of parameters. The default set of parameters may include, for example, a default amount of time for the connection mode (e.g., two minutes), allowing any type of computing device to join during the connection mode, and not requiring a password, e.g., similar to allowing a device 110 to join the network 130 when a physical WPS button or the like is pressed. The Customized Access button 210 may display a second user interface that allows a user to customize parameters for the connection mode.

Figure 3:
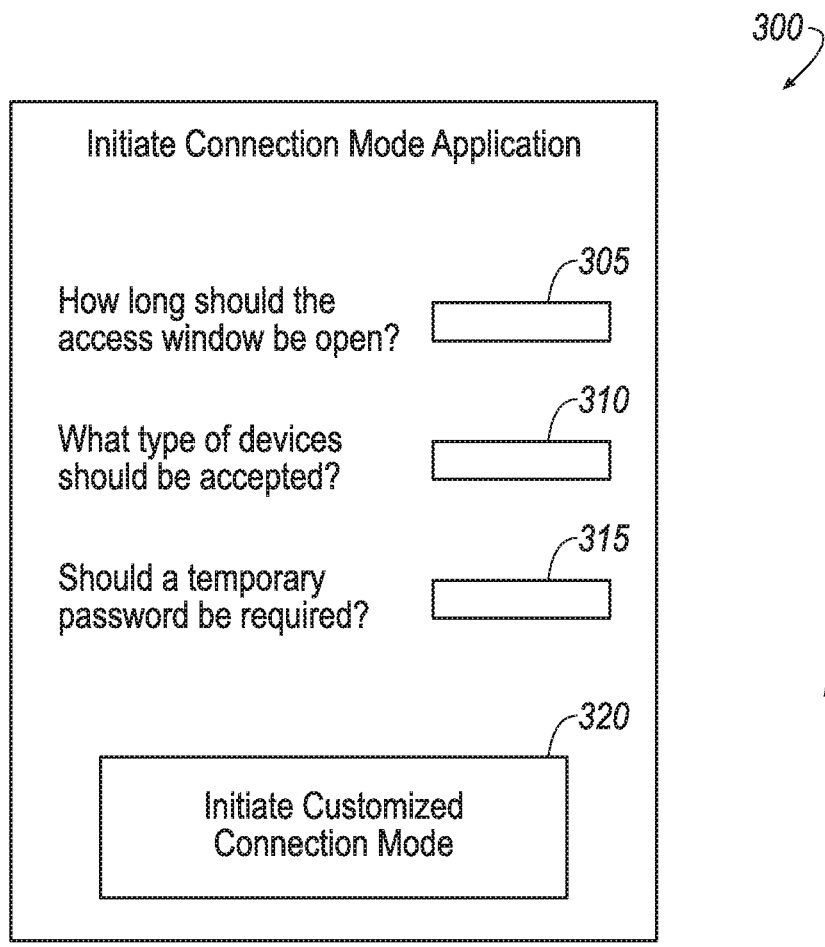
FIG. 3 is a user interface for selecting access parameters for the connection mode of FIG. 2 via the computing device.

FIG. 3 illustrates an example second user interface 300. The second user interface 300 may have a first input window 305 for inputting the amount of time for the connection mode, a second input window 310 for inputting a type of device that can join the wireless network 130 and a third input window 315 for selecting whether the user would like the router 115 to provide a temporary password to be used to join the wireless network 130.

Each of the input windows 305, 310, 315 may provide a list of choices (e.g., in a dropdown list or the like) from which the user may select. For example, the first input window 305 may provide a list of times (e.g., one minute, two minutes, five minutes, etc.) for opening the connection mode. The second input window 310 may provide a list of types of devices (e.g., smartphones, tablets, laptops, any, etc.). The third window 315 may provide the options "yes" to set up a temporary password and "no" to proceed without a temporary password.

The second user interface 300 may further include a "Initiate Customized Connection Mode" button 320 that sends a command to the router 115 to initiate the connection mode. When the user activates the button 320, the first computing device 105 can be programmed to send a command to the router 115 to initiate the connection mode according to the customized parameters.

Processing

Figure 4:
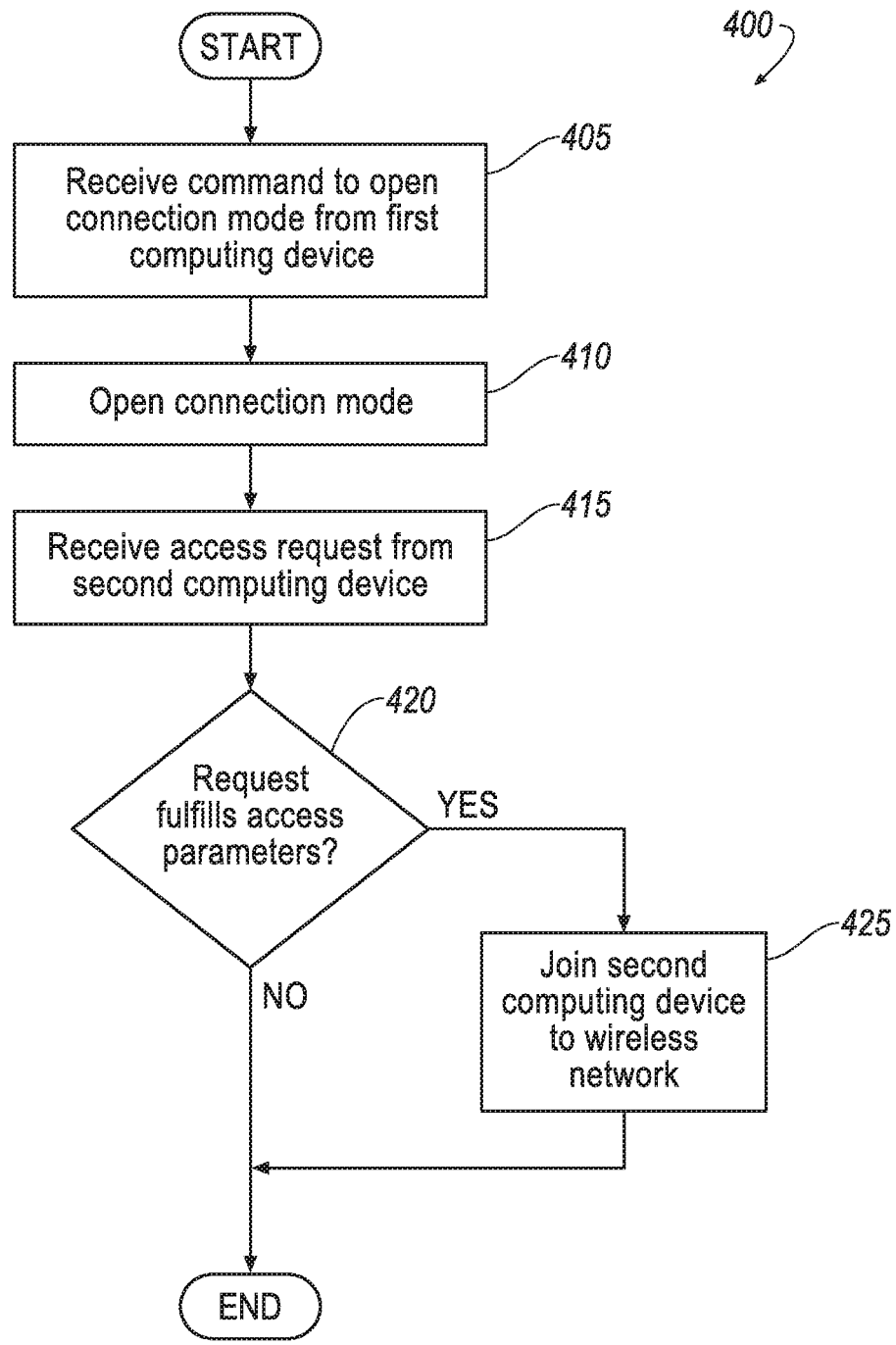
FIG. 4 is a flowchart of an example process for a router to receive a command to open the connection mode from a first computing device and then joining a second computing device to a wireless network provided by the router.

FIG. 4 is an example process 400 for the router 115 to open a connection mode based on a command provided from a first computing device 105 connected to the router 115, and for then joining a second computing device 110 to the wireless network 130 during the connection mode. The process 400 begins in a block 405.

In the block 405, the router 115 receives a command message from the first computing device 105 to initiate the connection mode. For example, a user of the first computing device 105 may activate the initiate connection mode application included on the first computing device 105. The application may have been previously downloaded to the first computing device 105 as described above. Alternatively, the user may, for example by activating an icon on the first computing device 105, request access to the initiate connection mode application. Based on the user input, the first computing device 105 may request the router 115 to provide access to the application. In response, the router 115 may transmit a web page to the first computing device 105. The web page may provide the user access to the initiate connection mode application.

Via the user interface provided via the first computing device 105, a user may input a request to the first computing device 105 to initiate the connection mode on the router 115 including access parameters such as an amount of time for the connection mode, type(s) of devices that can obtain access and whether the router 115 should set up a temporary password or the like. Further, the user interface on the user device 105 can prompt a user to provide the temporary password, personal identification number (PIN) or the like, to be provided by a user of a device 110. Thus, the router 115 can be instructed to e.g., randomly generate a brief PIN or password (e.g., 4 digits, 6 characters, etc.), and/or user input to a device 105 could provide the temporary password. The first computing device 105 can be programmed to then transmit the command message to the router 115.

Following the block 405, in the block 410, the router 115 initiates the connection mode based on the access parameters included in the command message. In the case that the command requests that the router 115 provide a temporary password, i.e., provided by the device 105 or generated by the router 115, the router 115 is programmed to transmit the temporary password to the first computing device 105. The process 300 continues in a block 415.

In the block 415, the router 115 may receive a request to join the second computing device 110 to the wireless network 130.

For example, a user of the second computing device 110 may open an interface on the second computing device 110 for selecting a network. The interface may include the wireless network 130 on a list of available networks. The user may then select the wireless network 130 from the list. The second computing device 110 may then, in response to the user selection, send a request to the router 115 to connect the second computing device 110 to the router. The request may include an identifier for the second computing device 110.

In a case that the access parameters specify that the user supply a temporary password, the router 115 may respond with a request to input the temporary password. In this case, the user may, for example, obtain the temporary password from the first computing device 105 (e.g., from the user of the first computing device). The user (e.g., the user of the second computing device 110) may then input the temporary password into the second computing device 110, and the second computing device 110 can transmit the temporary password to the router 115. The process 400 continues in a block 420.

In the block 420, the router 115 is programmed to determine whether the request fulfills the access parameters. That is, the router 115 determines whether the request is received within the connection mode, is from a computing device of a type authorized to obtain access, and, if required, includes the temporary password set up by the router 115. In the case that the request fulfills the access parameters, the process 400 continues in a block 425. Otherwise, the process 400 ends.

In the block 425, the computing device adds the second computing device 110 identifier to the list of authorized devices. The process 400 then ends.

In the case that the router 115 adds the identifier of the second computing device 110 to the list of authorized devices, the router 115 may, thereafter, from time-to-time, operate in a conventional manner to provide the device 110 network operations, e.g., to receive communications from the second computing device 110 and transmit them via the network 140 to the server 125 or other computing devices connected to the network 140 and transmit to the second computing device 110 communications received from the server 125.

CONCLUSION

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, e.g., embedded in a customized chipset, the Mac OSX and iOS operating systems distributed by Apple Inc. of Cupertino, Calif., and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system comprising a router including a processor, and a memory storing instructions executable by the processor to:
   receive a wireless request from a first computing device to initiate a connection mode for a wireless network;
   receive a set of parameters specifying the connection mode from the first device, wherein the set of parameters specifies at least one of an amount of time for the connection mode, or a type of computing device authorized to join the wireless network;
   initiate the connection mode based on the parameters;
   receive a wireless access request during the connection mode from a second computing device; and
   based on receiving the access request from the second computing device, join the second computing device to the wireless network under the connection mode;
   wherein the connection mode allows the second device to join the wireless network without application of either of:
   (1) a password stored by the router prior to the wireless request from the first computing device; or
   (2) a password that was previously received by the router as part of the wireless request from the first device.

2. The system of claim 1, wherein the connection mode is active for a predetermined time after initiation.

3. The system of claim 1, wherein the connection mode is a Wi-Fi protected setup (WPS) mode.

4. The system of claim 1, wherein:
   the parameters specify a type of computing device that can be joined to the wireless network during the connection mode; and
   the instructions further include instructions to:
      join the second computing device to the wireless network based on verifying that the second computing device is of the type of computing device specified by the set of parameters.

5. The system of claim 1, the instructions further including instructions to:
   verify that the request is received during the connection mode.

6. The system of claim 1, the instructions further including instructions to:
   provide the second computing device network operations based on joining the second computing device to the wireless network.

7. The system of claim 1, further comprising:
   the first computing device, including a second processor, and a second memory storing second instructions executable by the second processor to:
      transmit the wireless request to initiate the connection mode for a wireless network.

8. The system of claim 7, the second instructions including instructions to:
   display a user interface to a user;
   receive input from the user specifying an access parameter for the connection mode:
   and transmit the access parameter to the router.

9. The system of claim 8, wherein the second instructions further including instructions to:
receive the user interface from the router prior to displaying the user interface.

10. The system of claim 1, wherein the type of computing device includes one of a mobile telephone, a laptop, a desktop and a tablet.

11. A method, comprising:
receiving a wireless request from a first computing device to initiate a connection mode for a wireless network;
receiving a set of parameters specifying the connection mode from the first device, wherein the set of parameters specifies at least one of an amount of time for the connection mode, or a type of computing device authorized to join the wireless network;
initiating the connection mode based on the parameters;
receiving a wireless access request during the connection mode from a second computing device; and
based on receiving the access request from the second computing device, joining the second computing device to the wireless network under the connection mode;
wherein the connection mode allows the second device to join the wireless network without application of either of:
(1) a password stored by the router prior to the wireless request from the first computing device; or
(2) a password that was previously received by the router as part of the wireless request from the first device.

12. The method of claim 11, wherein the connection mode is active for a predetermined time after initiation.

13. The method of claim 11, wherein the connection mode is a Wi-Fi protected setup (WPS) mode.

14. The method of claim 11, wherein:
the parameters specify a type of computing device that can be joined to the wireless network during the connection mode; the method further comprising:
verifying that the second computing device is of the type of computing device specified by the set of parameters.

15. The method of claim 11, further comprising:
verifying that the request is received during the connection mode.

16. The method of claim 11, further comprising:
providing the second computing device network operations based on joining the second computing device to the wireless network.

* * * * *

UNITED STATES PATENT AND TRADEMARK OFFICE
CERTIFICATE OF CORRECTION

PATENT NO. : 10,980,069 B2
APPLICATION NO. : 16/227092
DATED : April 13, 2021
INVENTOR(S) : Emanuel Harrington, David McLaurin and Hasme Rafsan Jani It is certified that error appears in the above-identified patent and that said Letters Patent is hereby corrected as shown below:

On the Title Page

In the Abstract:
Item (57), in Line 7, replace "connection mode. wherein the connection" with -- connection mode wherein the connection --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*